Feb. 7, 1956  J. N. GLADDEN  2,733,965
VEHICLE TRACK
Filed April 12, 1952  2 Sheets-Sheet 1
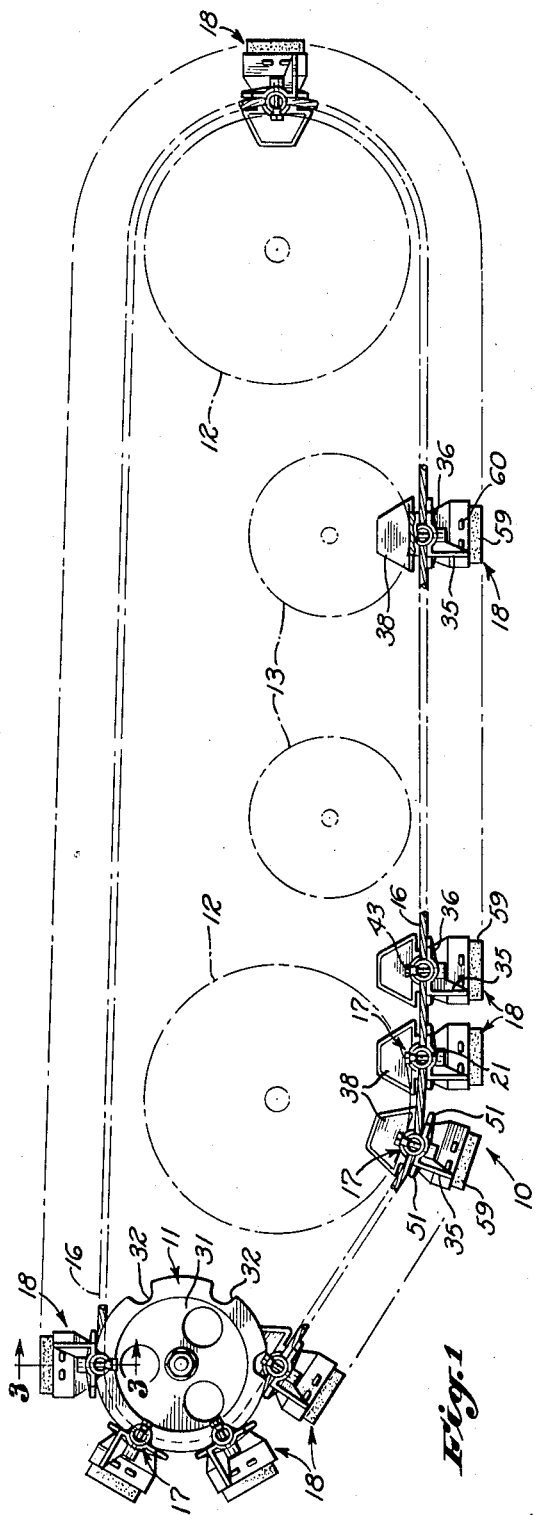
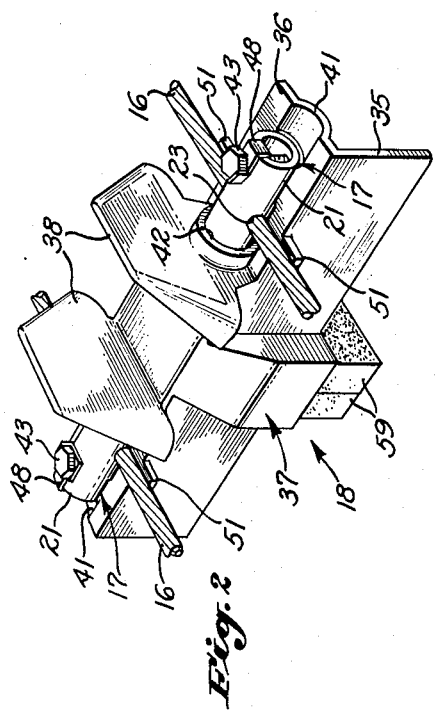
INVENTOR:
JOHN N. GLADDEN
BY HIS ATTORNEYS
HARRIS, KIECH, FOSTER & HARRIS
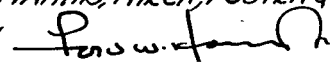

Feb. 7, 1956　　　　J. N. GLADDEN　　　　2,733,965
VEHICLE TRACK
Filed April 12, 1952　　　　　　　　　　2 Sheets-Sheet 2
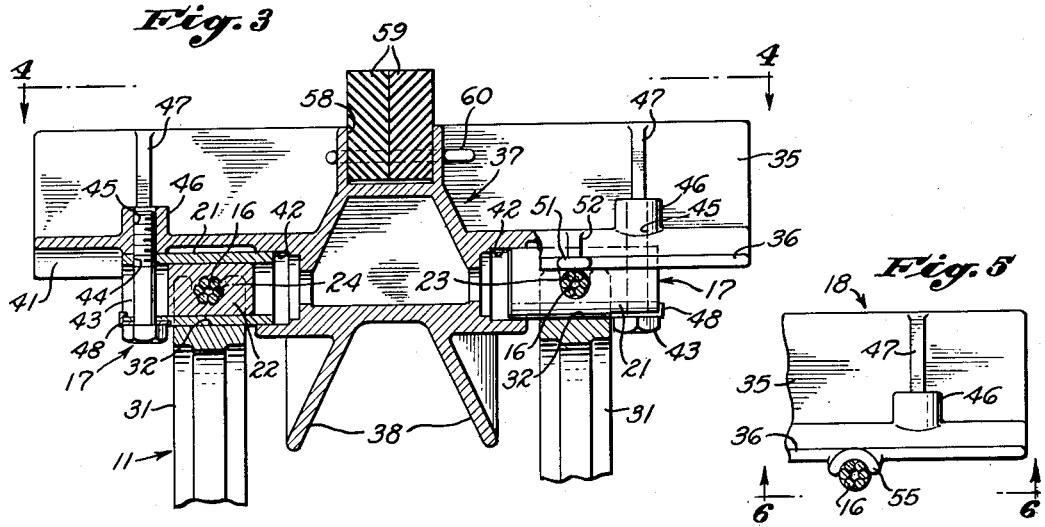
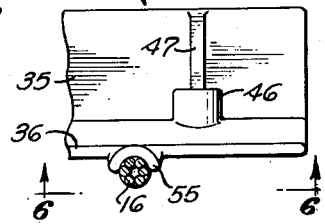
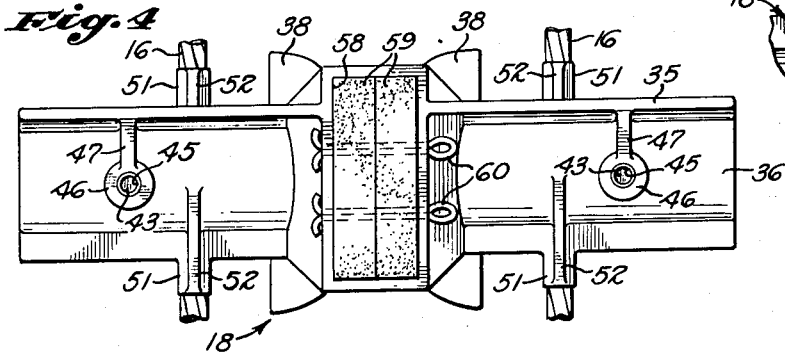
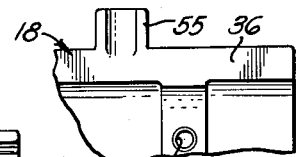
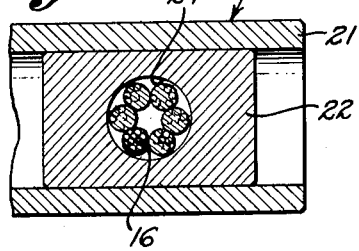
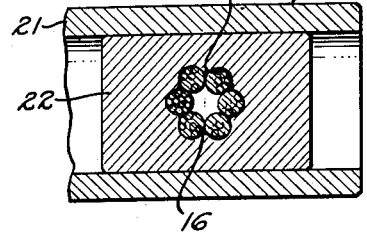
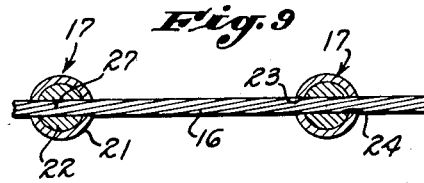
INVENTOR:
JOHN N. GLADDEN
BY HIS ATTORNEYS
HARRIS, KIECH, FOSTER & HARRIS

United States Patent Office 2,733,965
Patented Feb. 7, 1956

2,733,965

VEHICLE TRACK

John N. Gladden, Glendale, Calif., assignor to Gladden Products Corporation, Glendale, Calif., a corporation of California Application April 12, 1952, Serial No. 281,982

8 Claims. (Cl. 305—10)

The present invention relates in general to track-laying vehicles and, more particularly, to a track for such vehicles.

Important objects of the invention are to provide a vehicle track which is of relatively simple construction, which has no pivotal connections so that wear is minimized, and which may be repaired readily without removal from the vehicle.

With regard to the structure of the track of the invention, a primary object is to provide a vehicle track which includes at least one endless, flexible cable and which includes a plurality of grousers spaced apart along and secured to the cable.

In the presently preferred construction, two parallel cables are employed and the grousers are detachably connected to the cables in spaced relation. Thus, broken or damaged grousers may be replaced without removal of the track from the vehicle and one of the cables may even be replaced without removal of the track, which are important features. Also, the track achieves flexibility through the employment of the flexible cables, and not through the employment of pivotal connections, whereby wear is minimized, which is an important feature.

Another object is to provide grousers having outriggers which engage the cables to prevent tilting or tipping of the grousers, which is a feature of the invention.

An important object is to provide a track wherein grouser-mounting elements are swaged on the cables in spaced relationship, each grouser being detachably connected to a mounting element on one cable and to an aligned mounting element on the other cable.

Still another object is to provide a grouser-mounting element which includes a sleeve having therethrough a transverse hole through which one of the cables passes, and which includes a core disposed in the sleeve and having therethrough a registering hole through which the cable also passes, the core being swaged onto the cable.

Another important object of the invention is to provide a driving wheel for the vehicle track which has circumferentially spaced notches adapted to receive the grouser-mounting elements, power being delivered to the track from the driving wheel through the grouser-mounting elements.

Another important object is to provide a stranded cable wherein the strands are butt spliced at spaced points along the cable and wherein each butt spice is disposed within one of the swaged grouser-mounting elements. This construction substantially eliminates any possibility of splice failures, which is an important feature.

The foregoing objects and advantages of the present invention, together with various other objects and advantages thereof which will become apparent, may be attained with the exemplary embodiment of the invention which is illustrated in the accompanying drawings and which is described in detail hereinafter. Referring to the drawings:

Fig. 1 is a side elevational view of a vehicle track embodying the invention;

Fig. 2 is a fragmentary perspective view of the track showing a grouser mounted on a pair of cables;

Fig. 3 is an enlarged, fragmentary sectional view taken along the broken line 3—3 of Fig. 1;

Fig. 4 is a view taken as indicated by the arrowed line 4—4 of Fig. 3;

Fig. 5 is a fragmentary view, similar to the right end of Fig. 3, showing a modified grouser;

Fig. 6 is a view taken as indicated by the arrowed line 6—6 of Fig. 5;

Figs. 7 and 8 are enlarged, fragmentary sectional views showing a grouser-mounting element of the invention before and after swaging; and Fig. 9 is a fragmentary sectional view illustrating the cable splicing of the invention.

Referring particularly to Fig. 1 of the drawings, the vehicle track of the invention is designated generally by the numeral 10 and is shown as trained around a driving wheel 11, supporting wheels 12 and bogey wheels 13. The track 10 includes parallel, endless, flexible cable 16 which are preferably of stranded construction, two cables being illustrated, although this number may be varied. The cables 16 carry grouser-mounting elements 17 which are spaced apart along the cables, each element 17 on one of the cables being aligned with an element 17 on the other. Detachably connected to each pair of aligned grouser-mounting elements 17 is a grouser 18, the grousers being spaced apart along the cables.

As best shown in Figs. 2 and 3, the grouser-mounting elements 17 are cylindrical and each includes an outer sleeve 21 of a relatively hard, wear resisting material such as steel. As best shown in Figs. 3, 7 and 8, disposed within the sleeve 21 of each element 17 is a core 22 of a softer, swageable material, aluminum being an example. Each cable 16 passes through holes 23 and 24 in the sleeves 21 and the cores 22, respectively, of the grouser-mounting elements 17, as best shown in Fig. 7. After the cables have been threaded through the elements 17, the cores 22 are upset by axial forces applied to the ends thereof, thereby swaging the cores firmly onto the cables. Sufficient pressure is applied to each core 22 to cause the material thereof to flow into all of the crevices between the strands of the cable on which it is swaged and into the crevices between the individual wires of the strands, thereby providing a positive mechanical lock between each core and its cable, as indicated in Fig. 8 of the drawings. Also, the pressure applied to each core produces radial outward expansion thereof to firmly lock the core in its sleeve 21. Thus, after the grouser-mounting elements 17 have been swaged onto one of the cables 16 in this manner, a substantially integral structure results, which is an important feature.

Preferably, each endless cable 16 is fabricated from commercially available cable stock and a preferred way of splicing each cable will now be considered. Referring particularly to Fig. 9, the strands of each cable 16 are spliced at spaced points along the cable, as indicated by the numerals 27 and 28, so that no two strands are spliced at the same point. Simple butt splices are shown for the individual strands, although other types of splices may be used if desired. One of the grouser-mounting elements is then swaged onto the cable at each strand splice, as indicated in Fig. 9. If desired, adjacent strand splices may be disposed within adjacent grouser-mounting elements 17. Alternatively, adjacent strand splices may be disposed within alternate grouser-mounting elements 17, or may be disposed within every third, every fourth, or every fifth grouser-mounting element, or the like. After all of the grouser-mounting elements 17 have been swaged onto one of the cables 16, the strand splices are positively locked in place so that the cable is, in effect, an integral structure, which is an important feature of the invention.

The grouser-mounting elements 17, in addition to serving as mounts for the grousers 18 in a manner to be described, perform an additional function in that they serve to transmit power from the driving wheel 11 to the track 10. Referring to Figs. 1 and 3, it will be noted that the driving wheel 11 includes two discs 31 which are rigidly connected together in any suitable manner, not shown, as by being fixed on a common shaft to which power from any suitable source, not shown, is supplied. Each disc 31 is provided with a plurality of circumferentially spaced, semi-cylindrical, peripheral notches 32 each adapted to receive one of the cylindrical grouser-mounting elements 17, as shown clearly in Fig. 1. Thus, as the track 10 moves around the driving wheel 11, successive ones of the grouser-mounting elements 17 engage in successive ones of the notches 32, the elements 17 on the respective cables 16 engaging in the notches in the respective discs 31.

Considering the grousers 18 in detail, each grouser is generally angle-shaped in cross section, having a leg 35 which is vertical when such grouser is in contact with the ground, or other surface, and having a leg 36 which is horizontal when such grouser is in contact with the ground. Optimum traction and flotation on soft footing, such as snow, for example, are obtained when the widths of the vertical and horizontal legs 35 and 36 and the spacings between horizontal legs 36 are all approximately equal, which is an important feature of the invention. As an example, if the center-to-center spacing of the grousers along the cables 16 is four inches, then the widths of the vertical and horizontal legs 35 and 36 are preferably approximately two inches.

Each grouser 18 includes a central body portion 37 which carries two diverging flanges 38 forming a saddle which is engageable with the supporting wheels 12 and the bogey wheels 13, these wheels, as is conventional, having rims which fit into the saddles defined by the flanges 38.

As best shown in Fig. 2, the leg 36 of each grouser 18 is provided with two arcuate recesses 41 disposed on opposite sides of the body portion 37 thereof and respectively adapted to receive the grouser-mounting elements 17 of one pair. Additionally, the body portion 37 of each grouser 18 is provided with cylindrical recesses or bores 42 respectively communicating with the arcuate recesses 41 and adapted to receive the inner ends of the elements 17 of the corresponding pair. Thus, in order to mount one of the grousers 18, it is merely necessary to slip the inner ends of the corresponding grouser-mounting elements 17 into the respective bores 42. Each grouser 18 is detachably connected to the corresponding elements 17 by bolts 43, each bolt 43 extending through a hole 44 through the corresponding element 17 and being threaded into a tapped hole 45 in the grouser itself. As best shown in Figs. 3 and 4, the tapped holes 45 are formed in integral bosses 46 on the leg 36, the bosses being braced by integral webs 47 extending between the bosses and the leg 35. As best shown in Fig. 2, locking devices 48 engageable with the outer ends of the elements 17 and with the heads of the bolts 43 are provided to prevent backing off of the bolts in use.

As best shown in Figs. 2 and 4, each grouser 18 is provided with two pairs of outriggers 51, the outriggers of each pair being engageable with one of the cables 16 and extending outwardly from opposite sides of their grouser. The outriggers are braced by integral webs 52. As will be apparent from Fig. 2, the outriggers 51 engage the cables 16 to prevent twisting or tilting of the grousers 18 relative to the cables about horizontal axes, which is an important feature.

In Figs. 5 and 6 of the drawings, a modified outrigger 55 is shown. The outrigger 55 is similar to one of the outriggers 51, but is of arcuate cross section to provide a saddle for reception of one of the cables 16. With this construction, any tendency of the grouser to twist about a vertical axis, as well as about a horizontal axis, is minimized.

As best shown in Figs. 3 and 4, the central body portion 37 of each grouser 18 provides a recess 58 for a tread element 59 of cushioning material, such as rubber, each tread element being retained in its recess in any suitable manner, as by pins 60. The tread elements 59 come into play primarily only when the vehicle is being propelled over a hard surface, such as pavement, for example. With a soft footing, such as is found in snow, for example, the grousers penetrate to an extent such that the load is carried by the horizontal legs 36 of the grousers primarily. Thus, the tread elements 59 come into play when the surface is hard enough to withstand a high unit loading, and the legs 36 comes into play when the surface will not permit a high unit loading.

The tread elements 59 extend transversely of the grousers 18 and are spaced apart relatively short distances when in contact with the ground so that a more or less continuous tread is provided on hard surfaces. This relatively close spacing of the tread elements 59 minimizes chatter and vibration as successive tread elements move downwardly into contact with the ground.

It will be noted that any one of the grousers 18 may be removed readily for replacement merely by loosening the two bolts 43 which attach it to the corresponding pair of grouser-mounting elements 17. Also, this may be done without removing the track 10 so that grouser replacement is greatly simplified, which is an important feature of the invention. Also, if one of the cables 16 is broken or damaged, it may be removed merely by loosening all of the bolts 43 which attach the grousers 18 to the grouser-mounting element 17 carried thereby. Subsequently, such cable may be replaced by a new one carrying the necessary grouser-mounting elements 17. Thus, it will be seen that servicing and repair of the track 10 are greatly facilitated, which is an important feature of the invention.

While I have disclosed an exemplary embodiment of the invention herein for purposes of illustration, it will be understood that various changes, modifications and substitutions may be made therein without departing from the spirit of the invention.

I claim as my invention:

1. In a vehicle track, the combination of: a pair of parallel, flexible, endless cables; a plurality of cylindrical grouser-mounting elements carried by each of said cables and secured thereto, the grouser-mounting elements carried by one of said cables being aligned with the respective grouser-mounting elements carried by the other of said cables; a grouser connected to each pair of aligned grouser-mounting elements, each grouser having therein a pair of aligned cylindrical recesses respectively receiving ends of said grouser-mounting elements; and means for detachably securing said grousers to the respective pairs of grouser-mounting elements.

2. A vehicle track according to claim 1 wherein the means last defined includes bolts extending through said cylindrical grouser-mounting elements and threaded into said grousers.

3. In a vehicle track, the combination of: a pair of parallel, endless, flexible cables; a plurality of grouser-mounting elements spaced apart along and secured to each of said cables, said grouser-mounting elements on one of said cables registering with the respective grouser-mounting elements on the other of said cables, each of said grouser-mounting elements including a sleeve having therethrough a transverse hole through which the cable on which it is mounted passes, and including a core having therethrough a registering hole through which said cable passes, said core being swaged on said cable; and a plurality of grousers extending transversely of said cables and each detachably connected to a grouser-mounting element on one of said cables and the corresponding grouser-mounting element on the other of said cables, said grousers being secured to said grouser-mounting elements by bolts extending through said sleeves of said grouser-mounting elements and connected to said grousers.

4. In a vehicle track, the combination of: a pair of parallel, endless, flexible cables; a plurality of grouser-mounting elements spaced apart along and secured to each of said cables, said grouser-mounting elements on one of said cables registering with the respective grouser-mounting elements on the other of said cables, each of said grouser-mounting elements including a sleeve having therethrough a transverse hole through which the cable on which it is mounted passes, and including a core having therethrough a registering hole through which said cable passes, said core being swaged on said cable, each of said cables being provided with a plurality of strands spliced at spaced points along said cable, each of said splices being within the swaged core of one of said grouser-mounting elements; and a plurality of grousers extending transversely of said cables and each detachably connected to a grouser-mounting element on one of said cables and the corresponding grouser-mounting element on the other of said cables.

5. In a vehicle track, the combination of: a pair of parallel, endless, flexible cables; a plurality of grouser-mounting elements spaced apart along and secured to each of said cables, said grouser-mounting elements on one of said cables registering with the respective grouser-mounting elements on the other of said cables, said grouser-mounting elements being swaged on said cables, and each of said cables being provided with a plurality of strands spliced at spaced points along said cable, each of said splices being within one of said swaged grouser-mounting elements; and a plurality of grousers extending transversely of said cables and each detachably connected to a grouser-mounting element on one of said cables and the corresponding grouser-mounting element on the other of said cables.

6. In a vehicle track, the combination of: a flexible, endless cable; and a plurality of grouser-mounting elements spaced apart along and swaged on said cable, said grouser-mounting elements being cylindrical and extending transversely of said cable for reception by semicylindrical, circumferentially spaced, peripheral notches in a drive wheel around which said cable is trained.

7. In a vehicle track, the combination of: a flexible, endless cable; and a plurality of grouser-mounting elements spaced apart along and swaged on said cable, each of said grouser-mounting elements including a sleeve having therethrough a transverse hole through which said cable passes, and including a core within said sleeve having therethrough a registering hole through which said cable also passes, said core being swaged on said cable, said cable including a plurality of strands spliced at spaced points along said cable, each of said splices being within one of said swaged cores.

8. In a vehicle track, the combination of: a flexible, endless cable; and a plurality of grouser-mounting elements spaced apart along and swaged on said cable, said cable being provided with a plurality of strands spliced at spaced points along said cable, each of said splices being within one of said swaged grouser-mounting elements.

References Cited in the file of this patent

UNITED STATES PATENTS

| | | |
|---|---|---|
| 1,270,531 | Linn | June 25, 1918 |
| 1,307,622 | Dickerson | June 24, 1919 |
| 1,660,104 | Smyth | Feb. 21, 1928 |
| 1,965,244 | Lamb et al. | July 3, 1934 |
| 2,133,653 | Bomford et al. | Oct. 18, 1938 |
| 2,362,638 | Kilborn | Nov. 14, 1944 |

FOREIGN PATENTS

| | | |
|---|---|---|
| 524,132 | France | May 7, 1921 |